Nov. 11, 1958  H. H. McCALLISTER  2,859,803
SAFETY SEATING ARRANGEMENT FOR A HIGH SPEED CONVEYANCE
Filed May 28, 1956  5 Sheets-Sheet 1

*INVENTOR.*
HOWARD H. McCALLISTER
BY
*ATTORNEY*

Nov. 11, 1958 H. H. McCALLISTER 2,859,803
SAFETY SEATING ARRANGEMENT FOR A HIGH SPEED CONVEYANCE
Filed May 28, 1956 5 Sheets-Sheet 2

LOOKING AFT

INVENTOR.
HOWARD H. McCALLISTER
BY
Julian C. Renfro
ATTORNEY

Nov. 11, 1958  H. H. McCALLISTER  2,859,803
SAFETY SEATING ARRANGEMENT FOR A HIGH SPEED CONVEYANCE
Filed May 28, 1956  5 Sheets-Sheet 3

INVENTOR.
HOWARD H. McCALLISTER
BY
*Julian C. Renfro*
ATTORNEY

Nov. 11, 1958 H. H. McCALLISTER 2,859,803
SAFETY SEATING ARRANGEMENT FOR A HIGH SPEED CONVEYANCE
Filed May 28, 1956 5 Sheets-Sheet 4

LOOKING FORWARD

INVENTOR.
HOWARD H. McCALLISTER
BY
ATTORNEY

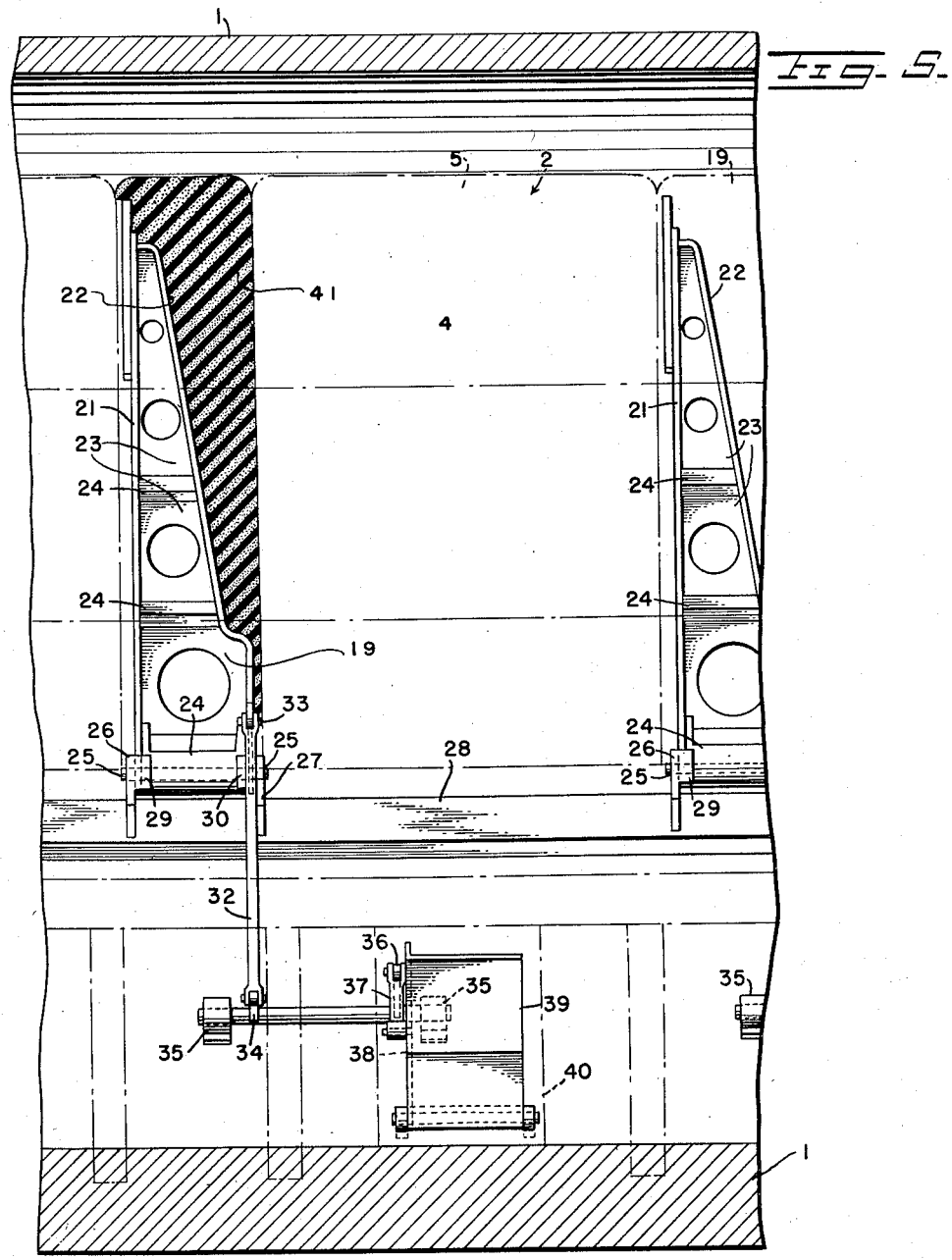

United States Patent Office 2,859,803
Patented Nov. 11, 1958

2,859,803

SAFETY SEATING ARRANGEMENT FOR A HIGH SPEED CONVEYANCE

Howard H. McCallister, Parkville, Md., assignor to The Martin Company, Middle River, Md., a corporation of Maryland Application May 28, 1956, Serial No. 587,688

10 Claims. (Cl. 155—189)

This invention relates to safety guards for occupants of high-speed conveyances, especially aircraft, and more particularly to guards for preventing occupants of longitudinally-existing seats from being thrown forward on the occasion of a crash or at any other time, when the inertia of the passenger would tend to cause him to be thrown toward the front of the conveyance.

In conventional aircraft where the seats extend transversely and the passengers face forwardly, it is common practice to provide the seats with safety belts. These belts are attached to the seats and adapted to be secured about the waist section of the seated passenger to hold him in the seat upon any deceleration or drop of the aircraft. While such safety belts are reasonably satisfactory where the aircraft has such transversely-extending seats, they are not satisfactory where the aircraft is of the type having longitudinally-extending seats and the passengers sit sidewise, facing a center aisle.

In accordance with the present invention, aircraft and the like having longitudinally-extending seats are provided with spaced guards extending forwardly from the seat backs and so positioned as to be located between and at each side of adjacent passengers. Thus, a guard will be located at the forward side of each passenger. Such guards provide a barrier preventing the passenger from being thrown forward on a crash landing, or the like. These guards extend upwardly a sufficient distance that their upper ends are opposite the shoulders of the passengers, and preferably to a position where they are opposite the heads of the passengers. Hence, upon the occasion of any condition which would tend to throw the passenger forward, his entire body is restrained against such movement. Since the guards or barriers are positioned at both sides of each passenger, each passenger is protected against forces which would tend to move him in either direction longitudinally of the aircraft. For that reason, the invention not only serves to protect the passengers on a longitudinally-extending seat from being thrown forwardly, in the direction of travel of the conveyance, upon the occasion of some unusual condition, but it also provides a barrier at his rearmost side and thereby eliminates the necessity of the passenger maintaining the usual muscular tension which passengers on such seats normally have to maintain to avoid being thrown against adjacent passengers on either side.

In the same manner that the invention provides means for preventing the body of the passenger from being thrown forward, it also provides means whereby the legs and knees of the passenger are prevented from being thrown forward, thereby assuring that the person of the passenger is fully protected.

More specifically, the invention contemplates an aircraft having longitudinally-extending seats along each side of a central aisle wherein arm rests are provided at each side of each seat and guards or barriers are positioned between the backs of each seat and normally lie in line with the backs of the seats, but are pivoted to be swung outwardly or transversely-forwardly over the arm rests and to be positioned between adjacent passengers when the seats are occupied. These outwardly-swinging guards or barriers are connected through suitable linkage to a foot and leg guard so that when the body guard is swung transversely-forwardly to operative position the foot and leg guard is automatically lowered to operative position.

The invention will be further described in connection with the accompanying drawings which illustrate a preferred embodiment of the invention. However, it is to be understood that such further disclosure is by way of exemplification and the invention is not limted thereby, but only to the extent set forth in the appended claims.

In the drawings:

Fig. 5 is a front elevation of the frame of the safety guard and the linkage for operating the foot and leg guard.

Figure 3:
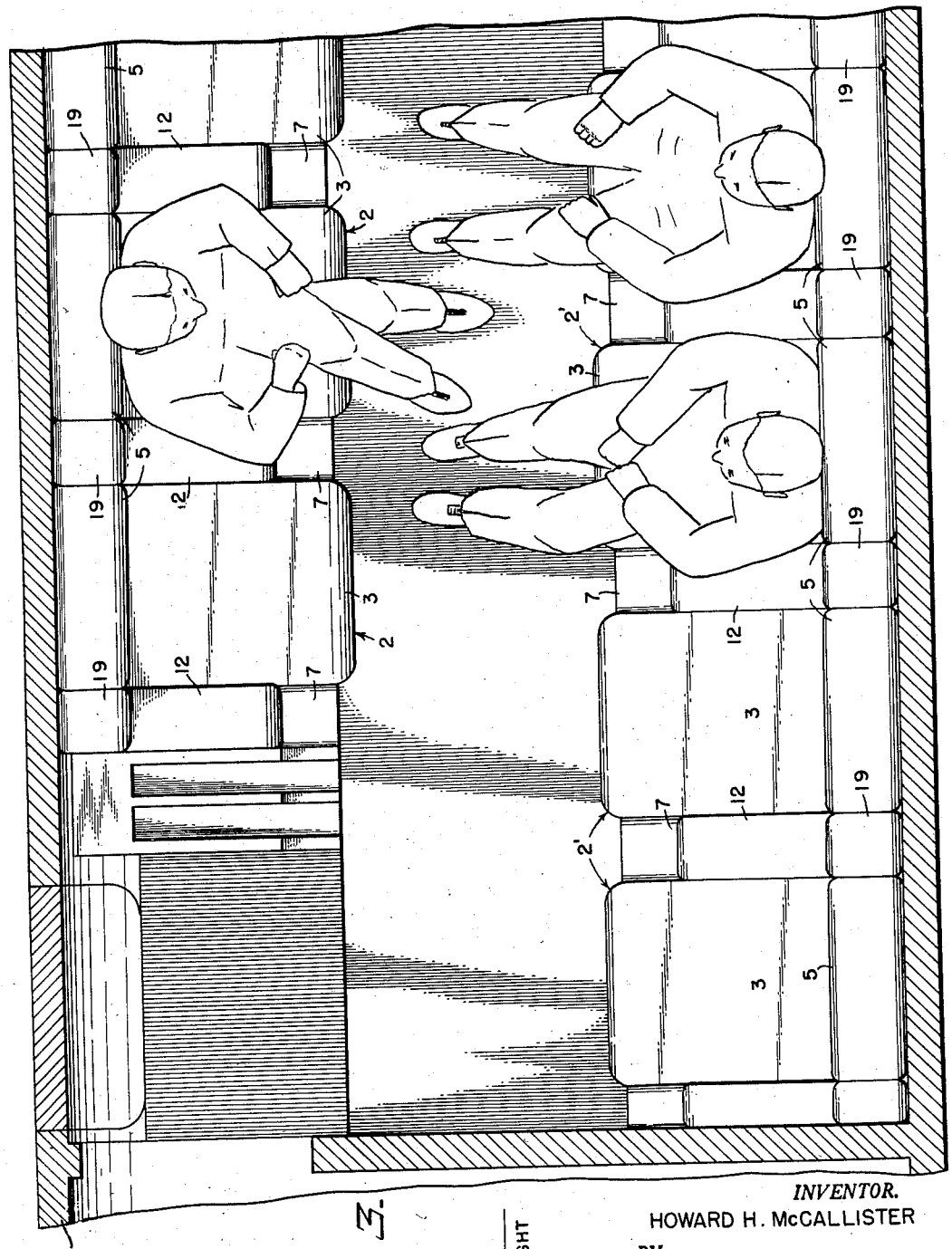
Fig. 3 is a horizontal sectional view showing the manner in which the seats along one side of the aisle are staggered relative to the seats on the other side of the aisle.

Referring now to the drawings, reference character 1 designates the cabin or fuselage of an aircraft having rows of seats 2 and 2' extending longitudinally thereof along each side of a central aisle. Each of the seats comprises a seat portion 3 and a back portion 4 having a head-supporting section 6. Each of the seats is provided with the usual safety belt 6 and arm rests 7 are provided between adjacent seats. The arrangement of the seats is such that the passengers sit sidewise facing a central longitudinal aisle. The seats are also so arranged that those along one side of the aisle preferably are staggered relative to those along the opposite side of the aisle, as shown in Fig. 3, so that the legs of the occupants of the seats along each side of the central aisle are opposite the arm rests of the seats on the other side of the aisle and between the legs of the occupants of adjacent seats on the other side of the aisle. Such an arrangement provides for additional leg room for the passengers where the central aisle is relatively narrow. Each arm rest is provided with a compartment 8 for the storage of an oxygen mask 9 and also has an oxygen regulator 9'. An ash tray 11 is located on the lower portion of the arm rest. The compartment 8 and the oxygen regulator 9' normally are covered by a hinged cover 12 which forms the top of the arm rest.

The cabin is provided with the usual fresh air outlet 13 and conditioned air outlet 14, central lights 15, individual lights 16 and windows or ports 17 located along the sides of the cabin and above the backs of the seats.

Figure 1:
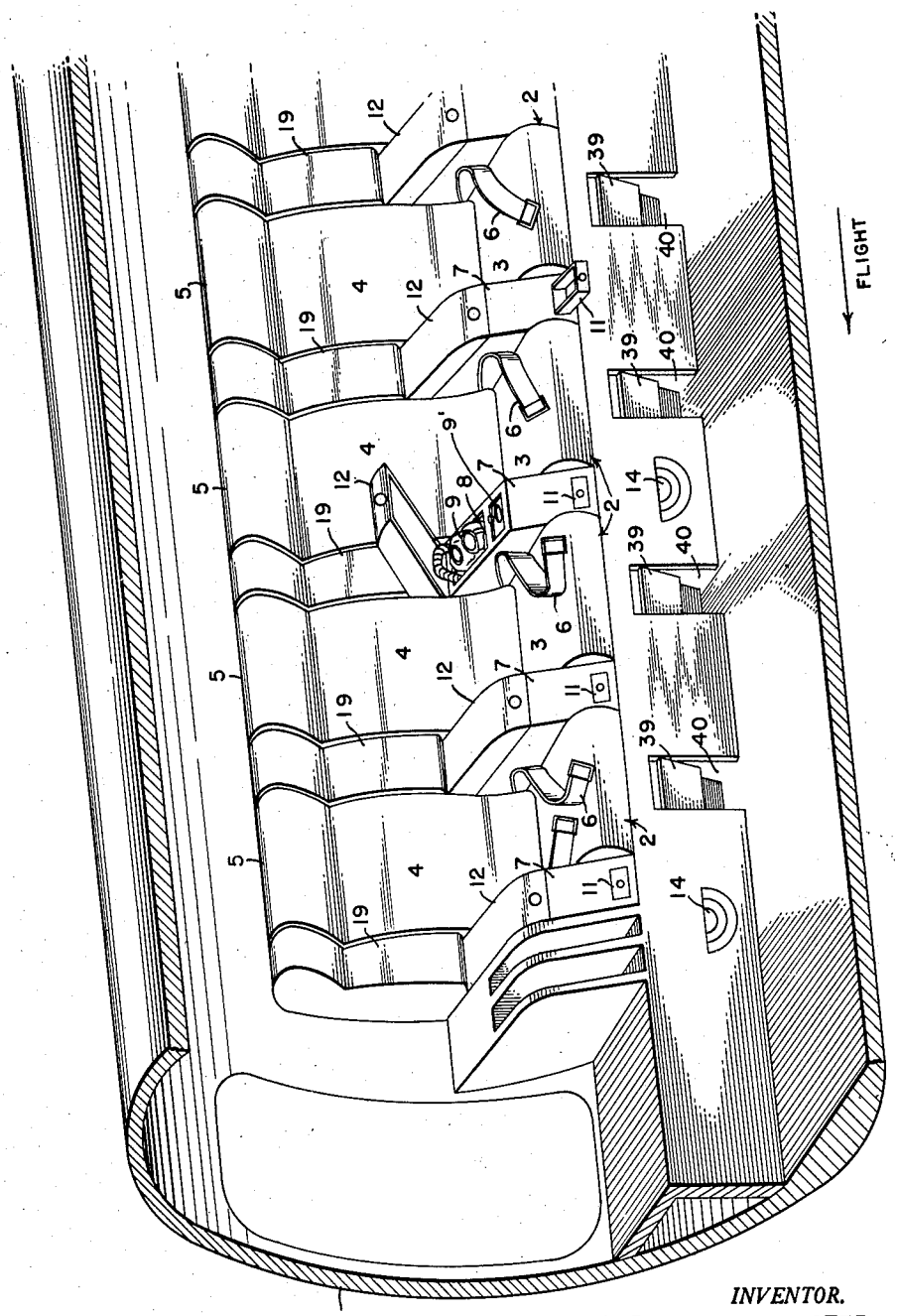
Fig. 1 is a perspective view, partly in section, of a portion of an aircraft cabin or fuselage, having longitudinally-extending seats and embodying the invention.
Figure 2:
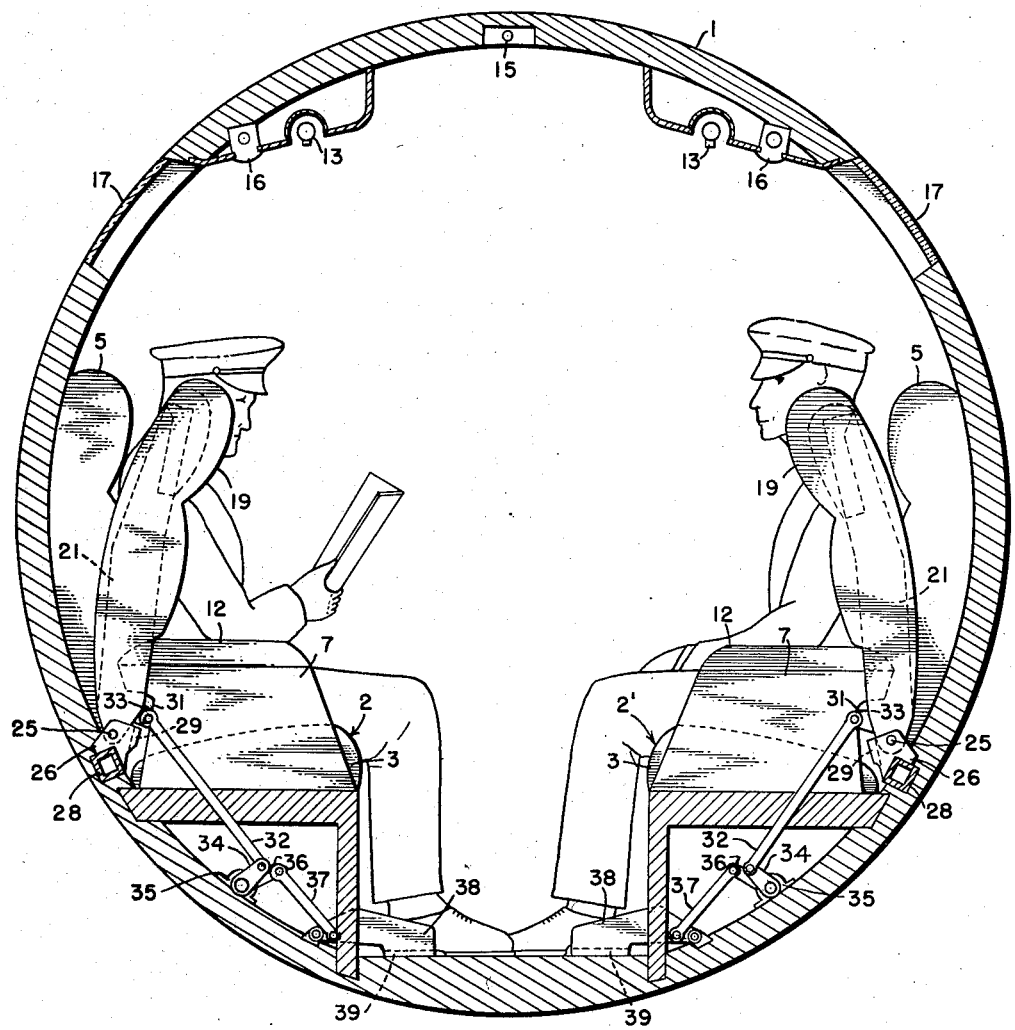
Fig. 2 is a transverse cross-sectional view of a cabin or an aircraft looking to the rear and showing the safety guards or barriers swung to their operative position.
Figure 4:
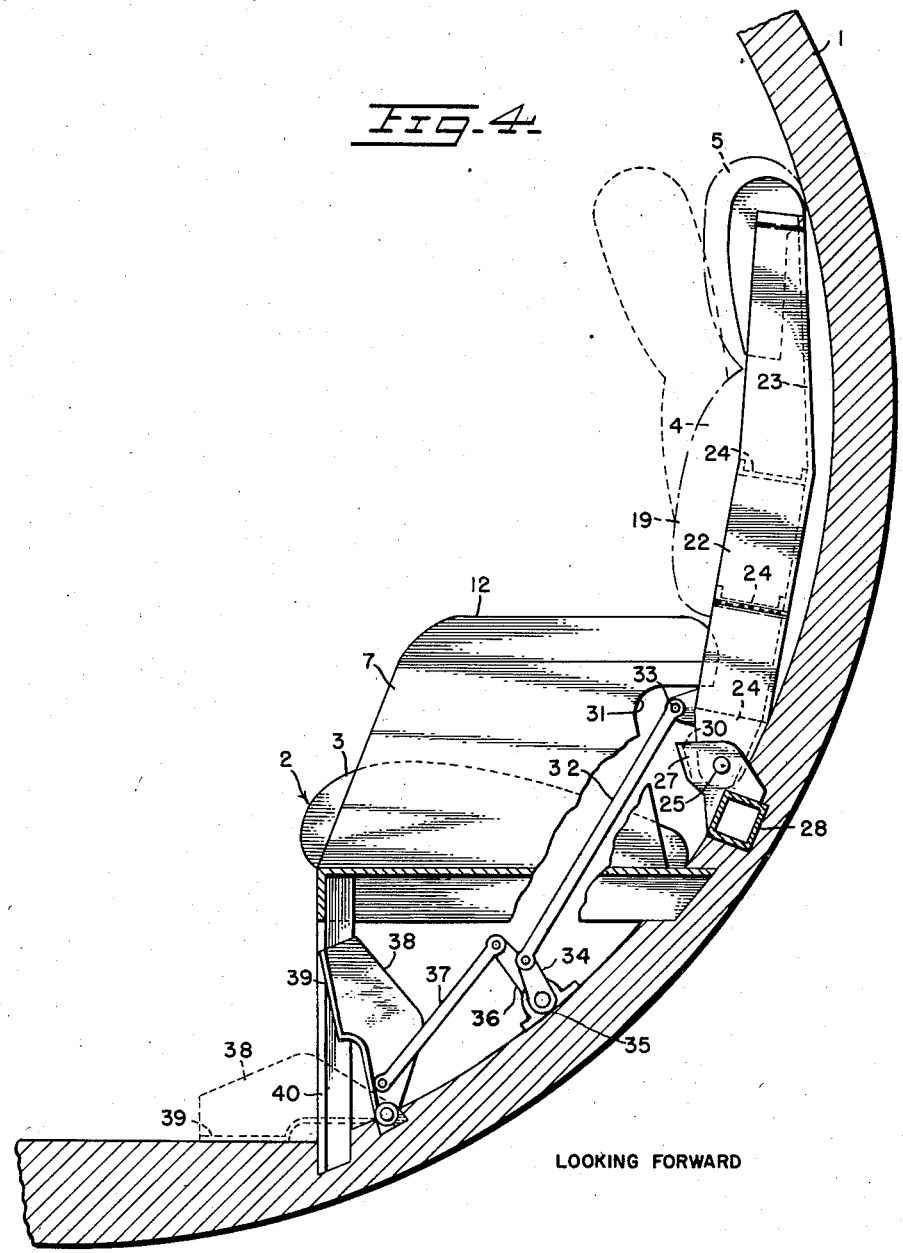
Fig. 4 is a transverse cross-sectional view showing in side elevation the frame of the safety guard and the linkage for operating the foot and leg guard.

The backs of the seats are spaced from one another a distance substantially equal the width of the arm rests to provide spaces for the safety guards or barriers 19 of the present invention. The structure of these guards and the manner in which they are pivoted for movement to their outward or operative position are best seen in Figs. 2, 4 and 5.

Each of the safety guards 19 is in the general nature of a cantilever beam and each comprises a pair of side members 21 and 22, a back member 23 and bracing channel members 24. The side member 21 is on the forward side of the safety guard with respect to the direction of flight, and side member 22 is on the rear side of the guard, extending upwardly and forwardly, and joining with member 21 near the top of the guard. The rearward side of the guard is padded for the passenger's safety and comfort such as by the use of sponge rubber or the like, as seen at 41 in Fig. 5.

The side members are spaced apart at their lower ends and are pivotally mounted at 25 to plates 26 and 27. These plates are welded to or otherwise secured to a tube 28, preferably of aluminum alloy, which is secured to and extends longitudinally of the framework of the cabin. The lower portion of guard 19 is therefore seen to be a bifurcated structure, with the side members 21 and 22 straddling the rear portion of arm rest 7. This arrangement permits each guard 19 to be pulled outwardly with respect to the seat back, so as to extend above the rear portion of its respective arm rest in the manner shown in Figs. 2 and 4. The outer portion of plates 26 and 27 have stop lugs 29 and 30 to provide an outer limit for the swinging of the guard. The rear portion of each arm rest is cut away at 31 to provide a space into which the lowermost of the bracing channel members 24 may extend when the guard is moved into its outward position.

A safety guard according to this invention has been described somewhat in relation to the arm rests 9, but it is to be understood that this invention is equally applicable for use in conveyances having no arm rests, for the arm rests form no integral part of the operation of this device.

According to another feature of this invention, the safety guard may be used in conjunction with a foot plate 39 that restrains the feet of the occupant, thus preventing forward lurching of the legs of the occupant during a crash landing or the like. To this end, a linkage is provided, comprising links 32 and 37, as seen in Figs. 2, 4 and 5. Link 32 is pivotally connected at 33 to the lower portion of side member 22, just above pivot 25. The lower end of link 32 is pivotally connected to one arm 34 of a bell crank, and the outer arm 36 of the bell crank is pivotally connected to the upper end of a link 37. The bell crank is rotatably mounted in bracket 35 fixed to the framework of the fuselage.

The lower end of link 37 is pivotally connected to side plate 38 of the foot plate 39. The foot plate is pivotally mounted so as to be movable between the raised position seen in full lines in Fig. 4, and the lowered position, seen in dotted lines in Fig. 4, and in full lines in Fig. 2. The arrangement of the linkage is such that the guard 19 and the foot plate 39 move relatedly, and the movement of either one causes movement of the other. The foot plate 39 is positioned on the floor substantially in alignment with the center line of the seat, so as to be located where the feet of the occupant normally are.

During ordinary landing and take-off, or when an emergency condition is anticipated, or at any other time when an occupant of the seat wishes to take advantage of the safety guard, he will pull out the safety guard at the longitudinally forward side of his seat, that is, at his side facing the direction of flight, so that it is opposite the upper portion of his body and his head. With the safety guard thus pulled out, it provides a positive barrier to movement of the occupant in the direction of flight upon a crash landing, or upon the occurrence of any other condition which would tend to cause the occupant to lurch forward in the direction of travel of the conveyance. Since the safety guard extends upwardly opposite the body and head of the occupant there is no danger of the upper portion of the body lurching in a forward direction while the hips are restrained by the arm rests, with resulting wrenching and crushing of the lower rib section of the body by the upper portion of the arm rest. If the next rearmost seat is not occupied, the occupant may also pull out the safety guard at his opposite, or longitudinally rear side. This will place a barrier at each side of him and eliminate the necessity of maintaining the usual muscular tension which one normally must maintain to retain his position on a seat extending longitudinally of a moving vehicle.

As the safety guard is pulled out to operative position, the link 32 moves downwardly and transversely of the conveyance and rocks the bellcrank lever. This, in turn, causes the link 37 to move downwardly and transversely of the conveyance to swing the side plate 38 and its attached foot plate to its lower or operative position. The occupant then places his feet on the foot plate 39. On the occasion of a crash landing, or the like, the feet and ankles of the occupant will be restrained against forward movement by the side plate 38. As previously stated, this will prevent forward lurching of the legs and knees, and thus further protect the person of the occupant.

By virtue of the linkage arrangement, instead of the occupant of the seat gripping and pulling the safety guard 19 outwardly to place it and the foot plate 39 in their operative positions, he may engage the free or distal end of the foot plate with his heel and push it downwardly to operative position. This simultaneously will cause the safety guard 19 to be swung outwardly, by reason of the above-described linkage, to its operative position. The action of the linkage is the same, except that a pulling force is exerted on the links 32 and 37 instead of a pushing force, as when the safety guard 19 is pulled outward.

When the foot plate is in the inoperative position, it is received in a recess 40 beneath the arm rest. To permit engagement with the end of the foot plate, the recess 40 may extend upwardly a sufficient distance to enable the occupant to get his heel back of the end of the foot plate.

Various changes may be made in the details of construction without departing from the spirit of the invention or sacrificing any of the advantages thereof.

I claim:

1. A passenger conveyance adapted for traveling at high speed comprising a seat extending longitudinally of the conveyance so that a passenger seated thereon sits facing athwartwise of the conveyance, the seat comprising a seat portion and a back portion, and a body safety guard or barrier positioned at the longitudinally-forward side of the seat and extending upwardly sufficient to be opposite the upper portion of the body of a passenger seated on the seat portion, said safety guard or barrier being pivoted for selectively swinging to a position wherein it is aligned with the back portion of the seat, and to a position wherein it extends for a limited distance transversely-forwardly of the back portion.

2. A passenger conveyance as set forth in claim 1 which also includes a foot and leg guard or barrier at the longitudinally-forward side of the seat, said leg guard or barrier further being transversely-forward of the seat and below the level of the seat portion, whereby it will be at the longitudinally-forward side of the legs and feet of a person seated on the seat.

3. A passenger conveyance as set forth in claim 2 in which the leg guard or barrier is pivoted for selectively swinging to a lowered operative position and to an upper inoperative position.

4. A passenger conveyance adapted for traveling at high speed comprising a seat extending longitudinally of the conveyance so that a passenger seated thereon seats facing athwartwise of the conveyance, the seat comprising a seat portion and a back portion, a body safety guard or barrier positioned at the longitudinally-forward side of the seat, said safety guard or barrier extending upwardly sufficient to be opposite the upper portion of the body of a passenger seated on the seat portion and pivoted for selectively swinging to a position wherein it is aligned with the back portion of the seat and to a position wherein it extends transversely-forward of the back portion, a foot and leg guard or barrier at the longitudinally-forward side of the seat, located transversely-forward of the seat and below the level of the seat portion so that it will be at the longitudinally-forward side of the legs and feet of a person seated on the seat, and linkage connecting the body safety guard or barrier with the leg safety guard or barrier said linkage being so constructed and arranged that swinging of the body safety guard or barrier to operative position causes the leg safety guard or barrier to be swung to its operative position.

5. A passenger conveyance for traveling at high speed having a plurality of adjacent seats extending longitudinally of the conveyance so that passengers seated on the seats sit facing athwartwise of the conveyance, each seat including a seat portion and a back portion, both the seat and back portions being spaced from adjacent seat and back portions, arm rests in the spaces between adjacent seat portions, and body safety guards or barriers in the spaces between adjacent back portions, said body safety guards or barriers extending upwardly above the arm rests sufficient to be opposite the upper portions of the bodies of passengers seated on the seat portions, said body safety guards or barriers being pivotally mounted at their lower portions for selectively swinging transversely-forward to operative positions where they extend between passengers on adjacent seats, and transversely-rearwardly to inoperative position, the lower portions of said safety guards or barriers having side members straddling the rear portions of the arm rests, so that the safety guards or barriers may be swung transversely-forwardly over the rear portions of the arm rests.

6. A passenger conveyance adapted for traveling at high speed comprising a seat extending longitudinally of the conveyance so that a person seated thereon sits facing athwartwise of the conveyance, the seat including a seat portion and a back portion, an arm rest at the longitudinal-forward side of the seat, a body safety guard or barrier positioned at the longitudinal-forward side of the seat, said safety guard or barrier extending upwardly sufficient to be opposite the upper portion of the body of a passenger seated on the seat, the lower portion of said safety guard or barrier having side members spaced a distance sufficient to straddle the rear portion of the arm rest, and means for pivotally mounting the safety guard or barrier to the framework of the conveyance below the upper level of the arm rest and at a position transversely-rearwardly of the arm rest so that the safety guard or barrier may be selectively swung transversely-forwardly to an operative position in which said side members straddle the rear portion of the arm rest and transversely-rearwardly to an inoperative position.

7. A passenger conveyance as defined in claim 6 in which a bridging member connects the side members at a level below the level of the top of the arm rest and the rear portion of the arm rest has a recess below its upper portion to receive the bridging member when the safety guard or barrier is swung transversely forward.

8. A passenger conveyance as set forth in claim 6 which also includes a leg guard or barrier both longitudinally-forward and transversely-forward of the seat, whereby it will be at the longitudinal-forward side of the legs and feet of a person seated on the seat, a bellcrank lever pivotally mounted intermediate the body safety guard and leg guard, and links connecting respectively the body guard and the leg guard to the respective arms of the bellcrank lever, so that when the body guard is swung transversely-forward to operative position the leg guard also will be swung transversely-forward to operative position.

9. A safety seating arrangement for a vehicle adapted to travel at substantial speed in which the seats extend longitudinally of the vehicle so that seat occupants face athwartwise, each seat including a back portion and a movable body safety guard or barrier positioned at the longitudinally-forward side of the seat, said safety guard or barrier being movable between a retracted position in which it is substantially aligned with said back portion of the seat, and a forward, operative position in which it is available to support the upper body and head portions of the seat occupant against undesired longitudinal motion during deceleration of the vehicle, said operative position of said safety guard or barrier being at an angle less than 45° with respect to said back portion of the seat.

10. The seating arrangement as defined in claim 9 including a leg guard or barrier positioned at the longitudinally-forward side of the seat, said leg guard being movable between retracted and operative positions, said leg guard and said safety guard being arranged to be relatedly movable, with movement of one of said guards to the operative position causing movement of the other to the operative position.

References Cited in the file of this patent

UNITED STATES PATENTS

| | | |
|---|---|---|
| 1,835,049 | Hottel | Dec. 8, 1931 |
| 2,308,747 | Froelich | Jan. 19, 1943 |
| 2,510,115 | Jakosky | June 6, 1950 |
| 2,556,076 | Evans et al. | June 5, 1951 |
| 2,777,531 | Erickson | Jan. 15, 1957 |

FOREIGN PATENTS

| | | |
|---|---|---|
| 4,018 | Great Britain | 1906 |